United States Patent [19]

Kim

[11] Patent Number: 5,223,960
[45] Date of Patent: Jun. 29, 1993

[54] IMAGE-PRODUCING APPARATUS FOR A VIDEO PRINTER

[75] Inventor: Jee H. Kim, Seoul, Rep. of Korea

[73] Assignee: Goldstar Co., Ltd., Seoul, Rep. of Korea

[21] Appl. No.: 660,716

[22] Filed: Feb. 22, 1991

[30] Foreign Application Priority Data

Feb. 27, 1990 [KR] Rep. of Korea ............... 2566/1990

[51] Int. Cl.⁵ .............................................. G02F 1/133
[52] U.S. Cl. ........................................ 359/54; 359/42; 359/59; 359/68; 359/72
[58] Field of Search .................. 350/331 R, 333, 334, 350/34 E, 339 F; 359/42, 54, 55, 59, 72, 68

[56] References Cited

U.S. PATENT DOCUMENTS

| | | | |
|---|---|---|---|
| 4,386,836 | 6/1983 | Aoki et al. | 350/346 X |
| 4,595,259 | 6/1986 | Perregaux | 350/331 R |
| 4,636,807 | 1/1987 | Head | 350/331 R X |
| 4,783,145 | 11/1988 | Hatanaka et al. | 350/331 R |
| 4,783,146 | 11/1988 | Stephany et al. | 359/72 |
| 4,810,058 | 3/1989 | Sangyoji et al. | 359/67 |
| 4,859,034 | 8/1989 | Shiraishi et al. | 350/331 R |
| 4,958,914 | 9/1990 | Owechko et al. | 350/342 |
| 4,986,637 | 1/1991 | Yamaguchi | 350/339 F |

Primary Examiner—John S. Heyman
Assistant Examiner—Huy K. Mai

[57] ABSTRACT

An image-producing apparatus for a video printer comprising a liquid crystal display having pixels of red, green, and blue adapted to produce an image in response to a scanning line signal from a video signal, light source disposed at the rear of the liquid crystal display and provided with a screen for producing the image of liquid crystal display on the photosensitive medium. The liquid crystal display comprises a liquid crystal portion including a plurality of liquid crystal elements having the same number and arrangement as those of a line of pixels aligned horizontally, each pixel having vertically-aligned color elements of red, green, and blue to correspond to an image of red, green, and blue colors. The image-producing apparatus of the present invention can reduce volume and the manufacture cost thereof, and provide various image display in order to improve image quality.

7 Claims, 7 Drawing Sheets

| α2\α7 | 0 | 10 | 20 | 30 | 40 | 50 | 60 | 70 | 80 | 90 | 100 |
|---|---|---|---|---|---|---|---|---|---|---|---|
| 0 | 0 | 0 | 0 | 0 | 0 | 0 | 0 | 0 | 0 | 0 | 0 |
| 6 | 0 | 0.6 | 1.2 | 1.8 | 2.4 | 3.0 | 3.6 | 4.2 | 4.8 | 5.4 | 6.0 |
| 10 | 0 | 1 | 2 | 3 | 4 | 5 | 6 | 7 | 8 | 9 | 10 |
| 15 | 0 | 1.5 | 3 | 4.5 | 6 | 7.5 | 9 | 10.5 | 12 | 13.5 | 15 |
| 20 | 0 | 2 | 4 | 6 | 8 | 10 | 12 | 14 | 16 | 18 | 20 |
| 26 | 0 | 2.6 | 5.2 | 7.8 | 10.4 | 13 | 15.6 | 18.2 | 20.8 | 23.4 | 26 |
| 34 | 0 | 3.4 | 6.8 | 10.2 | 13.6 | 17 | 20.4 | 23.8 | 27.2 | 30.4 | 34 |
| 44 | 0 | 4.4 | 8.8 | 13.2 | 17.6 | 22 | 26.4 | 30.8 | 35.2 | 39.6 | 44 |
| 68 | 0 | 6.8 | 13.6 | 20.4 | 27.2 | 34 | 40.8 | 47.6 | 54.4 | 61.2 | 68 |
| 90 | 0 | 9 | 18 | 27 | 36 | 45 | 54 | 63 | 72 | 81 | 90 |
| 100 | 0 | 10 | 20 | 30 | 40 | 50 | 60 | 70 | 80 | 90 | 100 |

IMAGE-PRODUCING APPARATUS FOR A VIDEO PRINTER

BACKGROUND OF THE INVENTION

The present invention relates to an image-exposing apparatus for a video printer, more particularly to an apparatus for recording an image obtained from an electric video signal on a photosensitive medium.

Conventionally, there have been known various methods for printing an image obtained from an electric video signal on a hard copy. For example, a photographic method has been known, which comprises the steps of converting an electric video signal into an optical image, and projecting light from said optical image on a photosensitive medium, in order to record or print an image on said photosensitive medium. As the photosensitive medium used in such photographic method, there are conventional photographic films and cycolor papers.

On the other hand, video printers utilizes a method wherein an optical image corresponding to one scanning line of an electric video signal is scanned to be recorded on a photosensitive medium. In such video printers, a cathode ray tube is generally used as a photosensitive device. In this case, an optical lens system may be used to accurately producing an optical image from the cathode ray tube on the photosensitive medium. Alternatively, a photographic method may be used, which comprises transmitting light from one pixel on the cathode ray tube to the corresponding pixel on the photosensitive medium by utilizing an optical fiber, and then contacting both ends of said optical fiber with the cathode ray tube and the photosensitive medium, respectively.

Figure 1:
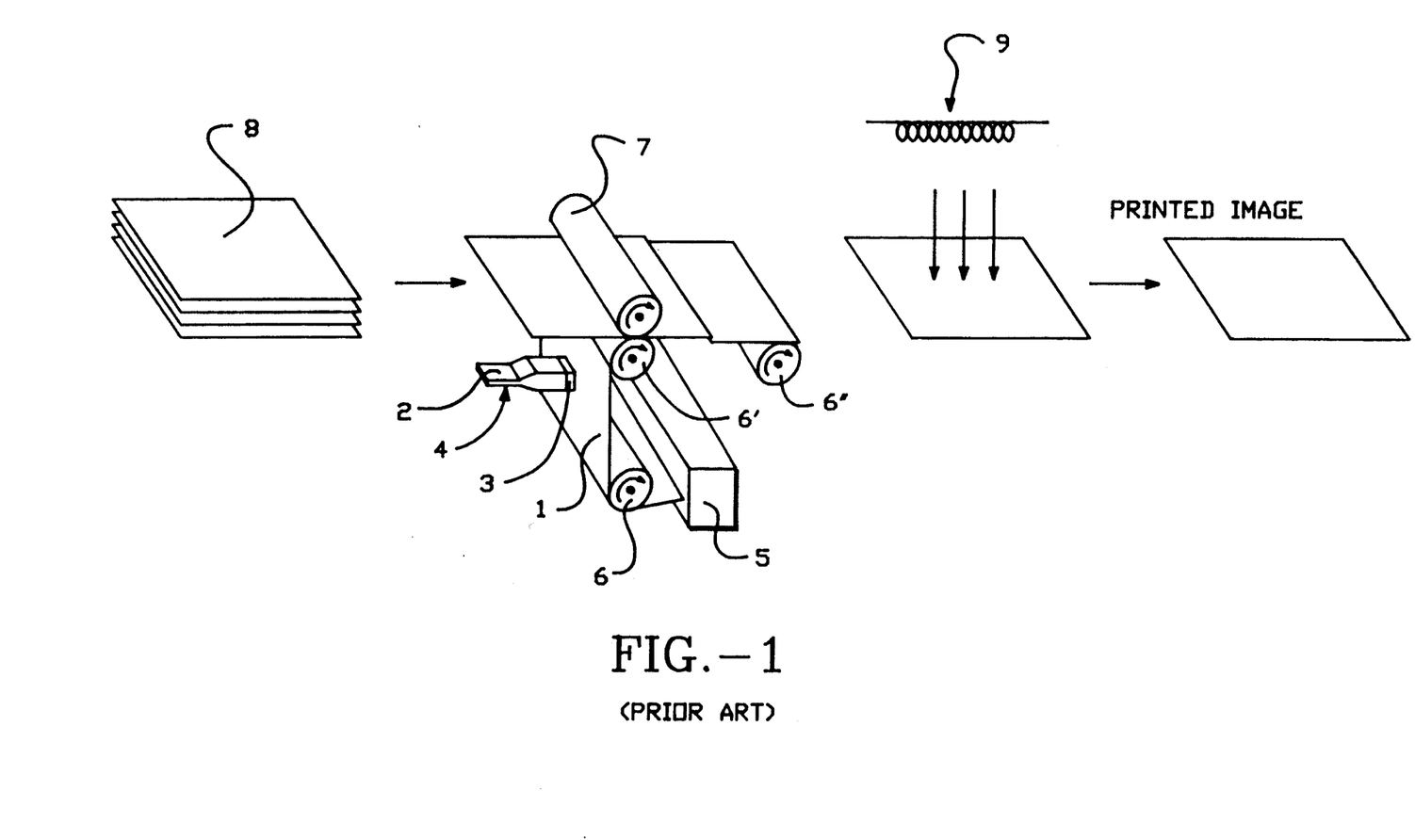
FIG. 1 is a schematic perspective view of a conventional image-exposing apparatus.

Referring to FIG. 1 there is shown typical example of a color video printer which comprises a fiber optics-cathode ray tube utilizing optical fibers. As shown in the drawing, the video printer includes a fiber optics-cathode ray tube 4 which is disposed at the front of and spaced from a photosensitive medium 1 positioned in the video printer. The fiber optics-cathode ray tube 4 comprises a cathode ray tube 2 of a conventional type and a fiber optics-face plate 3 adhered to the leading end of said cathode ray tube 2. Optical image produced on the screen of fiber optics-cathode ray tube 4 is recorded on the photosensitive medium.

In the drawing, reference numeral "5" designates a cartridge for containing the photosensitive medium 1 therein, "6", "6'", and "6" guide rollers, "7" a pressing roller, "8" a cycolor receiver paper, and "9" a heater.

However, the above-mentioned conventional apparatus requires an optical lens system or a fiber optics-cathode ray tube for accurately producing an optical image from the cathode ray tube on the photosensitive medium. As a result, there are disadvantages of increasing the overall size of the apparatus and the manufacturing cost, due to the complex construction. Particularly, when the fiber optics-cathode ray tube is used, the above-mentioned disadvantages become more serious, due to the requirement of various accessaries such as a high voltage generator, a magnetic shield, a yoke coil, and etc.

SUMMARY OF THE INVENTION

Therefore, an object of the present invention is to eliminate the above-mentioned disadvantages encountered in the prior art and to provide an image-exposing apparatus for a video printer which is of a fiber optics-liquid crystal display package type, thereby the volume and the manufacturing cost thereof to be reduced.

Another object of the present invention is to provide an image-exposing apparatus for a video printer which can provide various image display, in order to improve image quality.

In accordance with the present invention, these objects can be accomplished by providing an image-exposing apparatus for a video printer comprising: a liquid crystal display having pixels of red, green, and blue adapted to produce an image in response to a scanning line signal from a video signal; light source means disposed at the rear of said liquid crystal display and adapted to supply light in order to project said image of the liquid crystal display on a photosensitive medium; and a fiber optics-face plate disposed at the front of the liquid crystal display and provided with a screen for producing the image of liquid crystal display on said photosensitive medium.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

Figure 2:
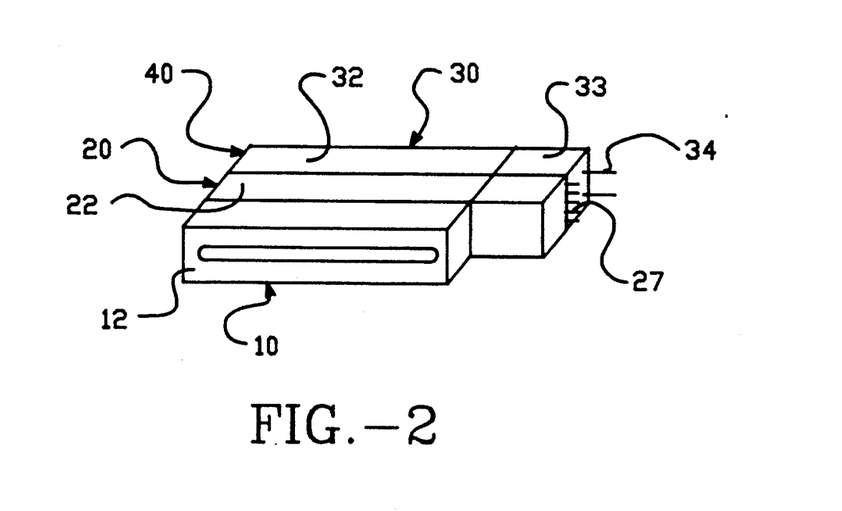
FIG. 2 is a perspective view of an image-exposing apparatus for a video printer in accordance with the present invention.
Figure 3:
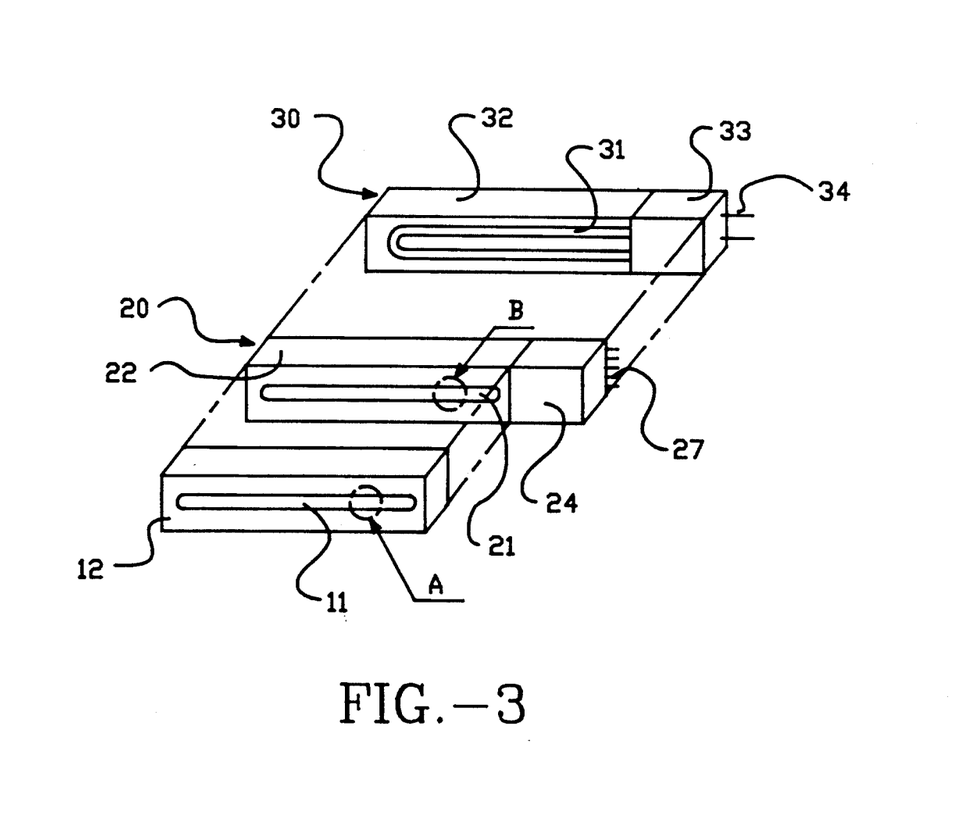
FIG. 3 is an exploded perspective view of the image-exposing apparatus shown in FIG. 2.
Figure 4:
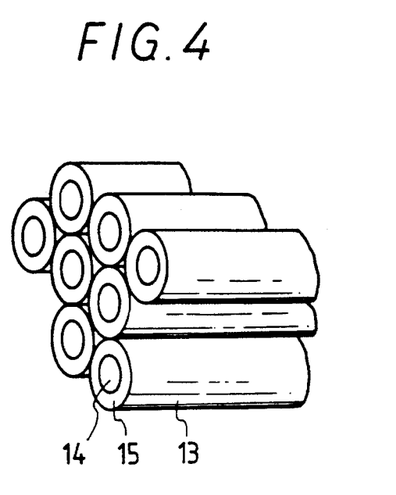
FIG. 4 is an enlarged perspective view of the portion A in FIG. 3.
Figure 5A:
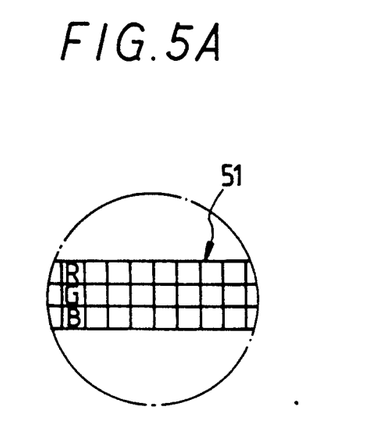
FIG. 5A is a partially-taken enlarged view of the liquid crystal display shown in FIG. 3.
Figure 5B:
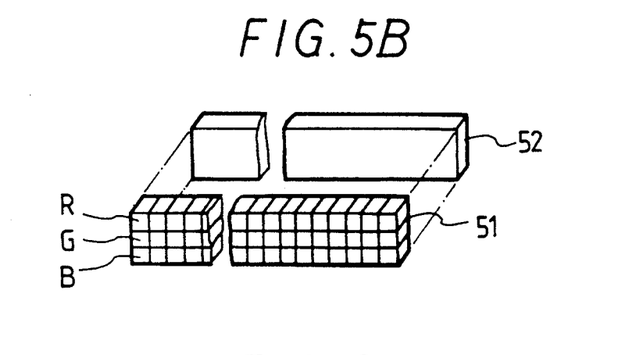
FIG. 5B is an exploded perspective view of a 3-color striped color filter and a panel of a monochrome liquid crystal light valve.

FIG. 2 is a perspective view showing a structure of an image-exposing apparatus of a video printer, FIG. 3 is an exploded perspective view showing the structure shown in FIG. 2, FIG. 4 is an enlarged view of a portion shown in FIG. 3, and FIGS. 5A and 5B are views showing a structure of a liquid crystal display portion shown in FIG. 3. As shown in the drawings, the image-exposing apparatus of a video printer of the present invention comprises a fiber optics-face plate 10, a liquid crystal display (LCD) 20 adapted to produce a line image and disposed securely to the rear face of said fiber optics-face plate 10, and a light source means 30 disposed securely to the rear face of said liquid crystal display 20. These are comprised of a fiber optics-liquid crystal display package 40 having a plate shape with uniform thickness.

The fiber optics-face plate 10 comprises a screen 11 transmitting an optical image and a case 12 supporting said screen 11. As shown in FIG. 4, the screen 11 has a typical structure as a bundle of optical fiber cables transmitting light. Specifically, the screen 11 is composed of fiber optical cables 13 each being formed of a fine fiber having a diameter of about 6–8$\mu$. Each fiber optical cable 13 comprises a core 14 transmitting light and a dark cladding 15 preventing light from coming through the cable 13. The screen 11 is in contact with a photosensitive medium applied with a photosensitive material receiving light, in order to transmit an optical image from the liquid crystal display 20 to the photosensitive medium and record it thereon.

The liquid crystal display 20 functions as an apparatus for producing an image of line shape of three colors, that is, red R, green G, and blue B, corresponding to a scanning line of TV video. The liquid crystal display 20 comprises a three color-line liquid crystal display portion 21, a case 22 supporting said liquid crystal display portion 21, and a driving means 24 securely mounted to one side of said case 22 to drive the liquid crystal display portion 21.

As shown in FIG. 5A, the liquid crystal display portion 21 comprises a color filter 51 comprising a line of pixels aligned horizontally for clearly displaying colors of pixels corresponding to an image of three colors, that is, red, green, blue. Each pixel includes three color elements, namely, red, green, and blue which are aligned vertically. Also, the liquid crystal display portion 21 (see FIG. 3) comprises a liquid crystal portion 52 disposed at the rear face of the color filter 51 as shown FIG. 5B. The liquid crystal portion 52 includes liquid crystal light valves for transmitting light from the light source means 30 (see FIG. 3) to said color filter 51 in response to the transmittivity determined according to a video signal.

Figure 6:
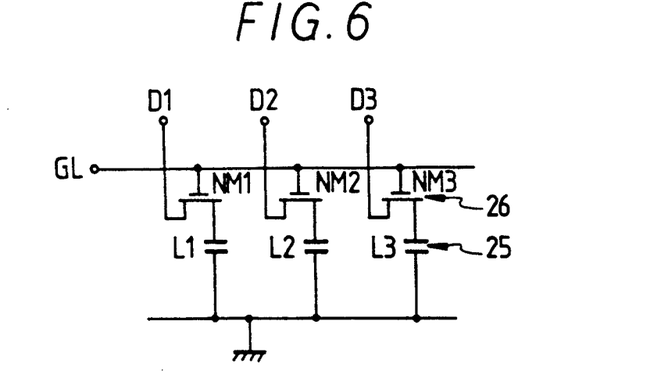
FIG. 6 is a diagram of a liquid crystal-driving circuit of a liquid crystal portion shown in FIG. 5B.

FIG. 6 is a diagram showing a liquid crystal-driving circuit for driving the liquid crystal portion 52. As shown in the drawing, red, green, and blue color-displaying liquid crystal light valves 25 (L1, L2, and L3) are connected to sources of thin film transistors 26 (NM1, NM2, and NM3), respectively. Each thin film transistor 26 includes a common gate line GL receiving a scanning line signal and drain lines D1, D2, and D3 receiving video signal voltages corresponding to respective colors of red, green, and blue, respectively, in order to drive each liquid crystal element 25.

Figure 7:
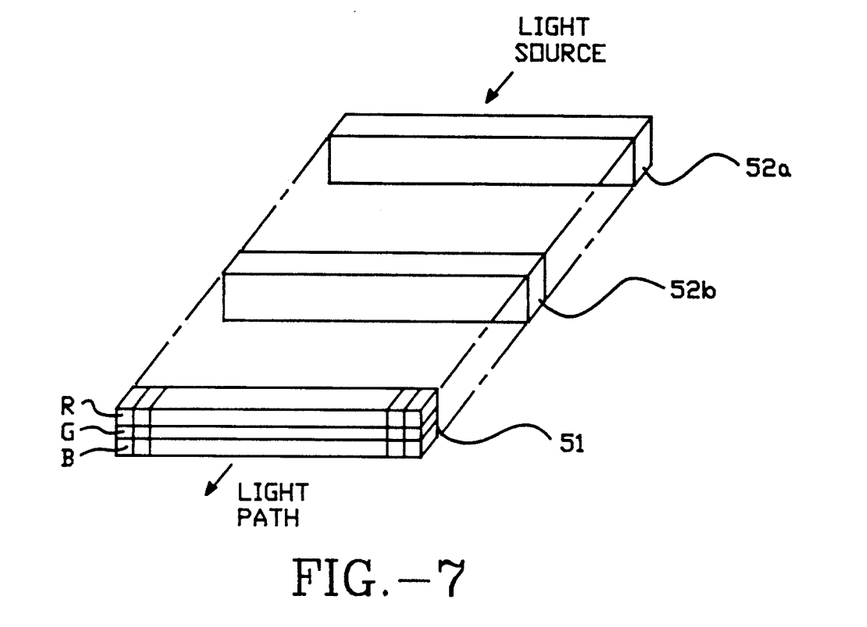
FIG. 7 is an exploded perspective view of another construction of a liquid crystal display in accordance with the present invention.

Also, FIG. 7 is a view showing a structure of a liquid crystal display portion in accordance with another embodiment of the present invention. The structure of FIG. 7 is identical to the structure of FIG. 5B except for including two liquid crystal portions 52a and 52b having different transmittivities in order to finely control the transmittivity in accordance with a video signal.

Figure 8:
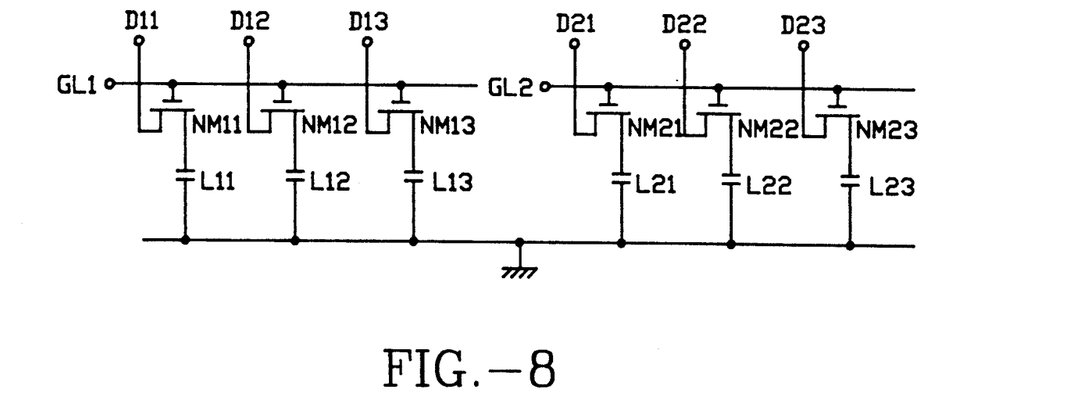
FIG. 8 is a diagram of a liquid crystal-driving circuit of FIG. 7.

FIG. 8 is a diagram showing a liquid crystal driving circuit of FIG. 7. As shown in the drawing, liquid crystal elements L11, L12, and L13 of the first liquid crystal portion 52a and liquid crystal elements L21, L22, and L23 of the second liquid crystal portion 52b are connected to sources of thin film transistors NM11, NM12, and NM13; NM21, NM22, and NM23, respectively. Each thin film transistor includes common gate lines GL1 and GL2 receiving a scanning line pulse and drain lines D11, D12, and D13; D21, D22, and D23 receiving video signal voltages corresponding to respective colors of red, green, and blue, respectively, in order to drive liquid crystal elements L11, L12, and L13; L21, L22, and L23.

Now, the conversion of the electric video signal into the optical image by the above-mentioned image-producing apparatus for the video printer in accordance with the present invention will be described in detail with reference to FIGS. 9 to 12.

When the scanning signal pulse is applied to the common gate line GL under the condition that video signal voltages of red, green, and blue are applied to drain lines D1, D2, and D3 in the liquid crystal driving circuit of FIG. 6, thin film transistors NM1, NM2, and NM3 are turned on to apply video signal voltages of red, green, and blue to liquid crystal light valves L1, L2, and L3, respectively. Then, liquid crystal light valves L1, L2, and L3 operate electrically to function as a capacitor, so that the transparency thereof is varied in proportion to video signal voltages.

Figure 9A:
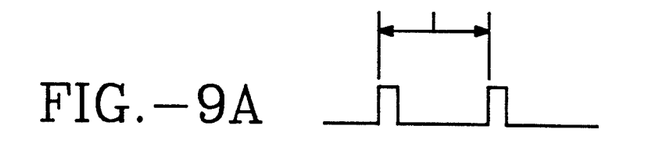
FIGS. 9A, 9B and 9C are waveforms of turn-on pulses with a period of t applied to the gate line (GL), video signals for a color pixel, applied to the corresponding drains (D), and a voltage maintained during a period by the liquid crystal light valve of the corresponding pixel, respectively.
Figure 9B:
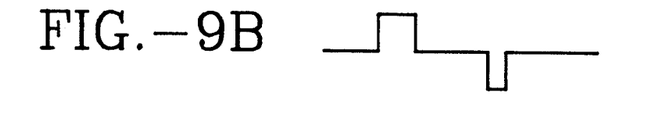
Figure 9C:
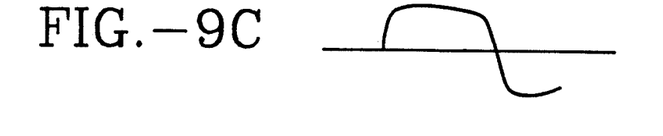

Namely, the thin film transistors 26 are turned on every one scanning time period t by the scanning line pulse input as shown in FIG. 9A, in order to drive liquid crystal light valves 25 corresponding to red, green, and blue pixels. Then, the video signal voltages applied through respective drain lines D1, D2, and D3 as shown in FIG. 9B are maintained in respective liquid crystal light valves 25 for one scanning time period t, as shown in FIG. 9(C). Thus, red, green, and blue video signals corresponding to respective pixels are applied to the corresponding drain lines to drive the corresponding liquid crystal light valves depending on a gate pulse, whereby transparencies of liquid crystal light valves 25 are varied with respective video signal voltages.

Figure 10:
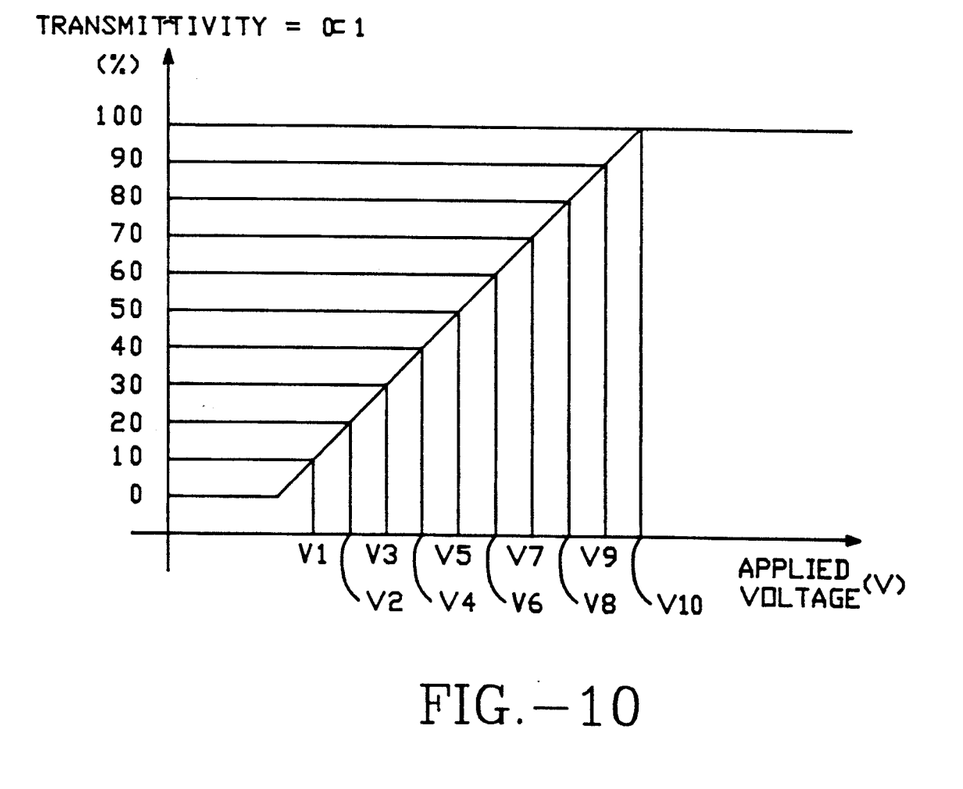
FIG. 10 is a waveform diagram explaining a transmittivity in the case of FIGS. 5A and 5B.

FIG. 10 is a waveform diagram showing the relationship between the transmittivity a1 of the liquid crystal portion 52 shown in FIG. 5B and the applied voltage V. Referring to the waveform diagram, it can be found that the transmittivity $a1$ (%) linearly varies in proportion to the voltage V applied depending upon the video signal.

On the other hand, the driving means 24 of the liquid crystal display 20 receives electric video signals corresponding to respective colors of red, green, and blue and timing clocks individually scanned with respect to respective pixels and generates signals corresponding to scanning signal and video signal terminals.

The three color images of red, green, and blue displayed on the liquid crystal display 20 appear as optical images, depending upon the transmittivity that light generated from the fluorescent lamp 31 of the light source means 30 passes through the liquid crystal portion 52. The optical images are transmitted to the fiber optics-face plate 10, whereby the photosensitive medium which is in contact with the screen 11 of the fiber optics-face plate 10 is chemically changed to record images thereon. At this time, each pixel line image of three colors of red, green, and blue corresponding to one scanning line is vertically scanned and recorded to obtain a complete planar image.

A signal voltage corresponding to each pixel is applied to each liquid crystal light valves 25 of the liquid crystal portion 52, in order to vary the transparency of said liquid crystal 25 in response to the applied voltage, and thus control the amount of light from the light source passing through the liquid crystal light valves 25. Accordingly, optical image are varied depending upon the controlled amount of light passing through each liquid crystal element 25 and recorded on the photosensitive medium through the fiber optics-face plate 10, thereby causing a final image output to be obtained Therefore, the more the transmittivity of the liquid crystal portion 52 is variously changed, the more the video signals can be delicately recorded (with higher resolution) on the photosensitive medium. In accordance with another embodiment of the present invention, there is used two liquid crystal portions 52a and 52b having different transmittivities $\alpha 1$ and $\alpha 2$, respectively, as shown in FIG. 7, in order to provide more variations in the transmittivity.

Figure 11:
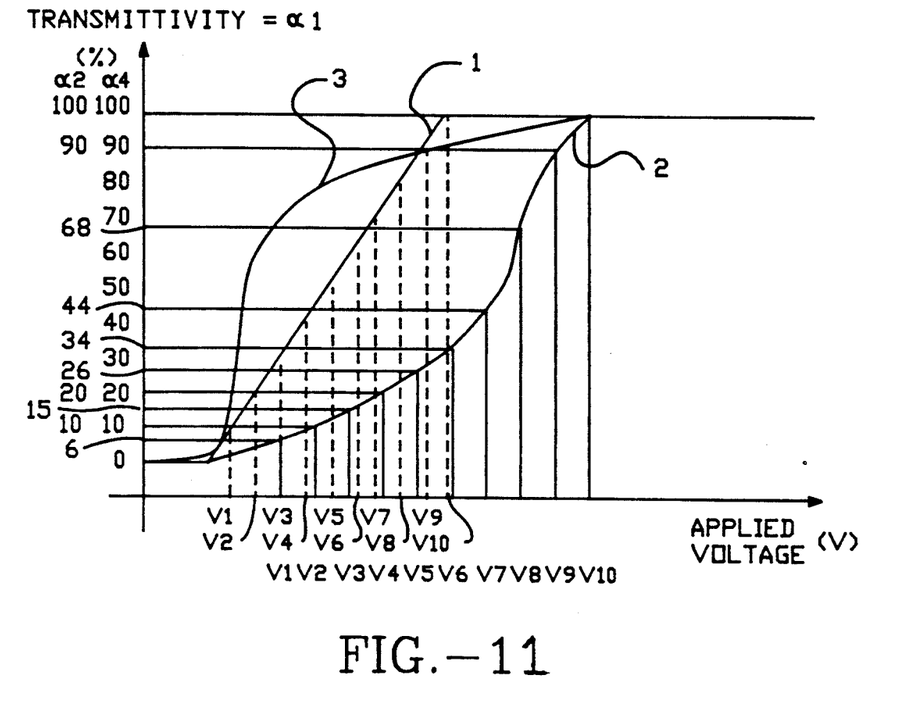
FIG. 11 is a waveform diagram explaining a transmittivity in the case of FIG. 7.
Figure 12:
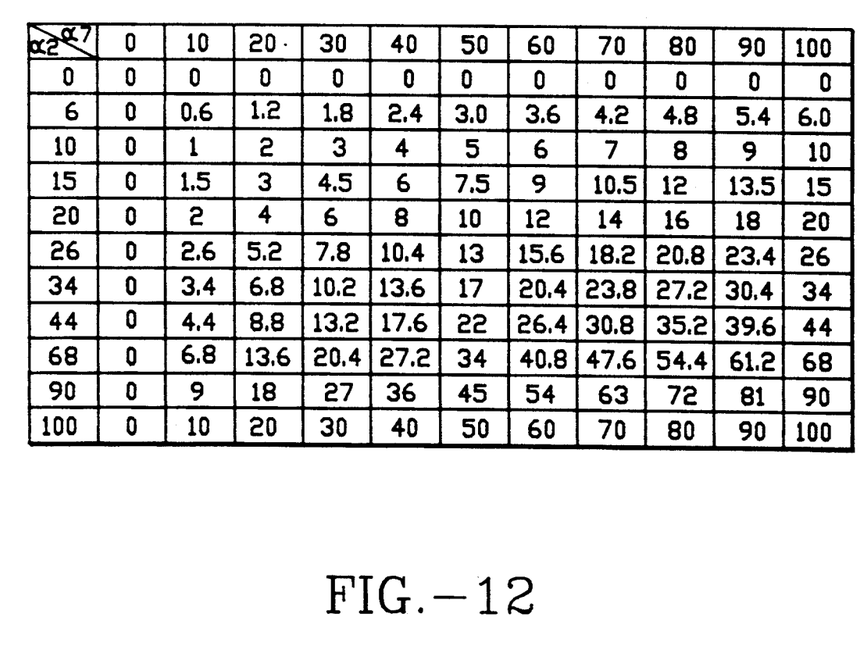
FIG. 12 is a table corresponding to FIG. 11.

FIG. 11 is a waveform diagram showing the relationship between the transmittivity and the applied voltage in the case of FIG. 7. FIG. 12 is a table for explaining the variation of transmittivity in the case of FIG. 11. Transmittivity characteristic of each liquid crystal can be designed depending upon the composition of the liquid crystal which is varied by an additive or like. If the transmittivity of the first liquid crystal portion 52a is determined to be the transmittivity $\alpha 1$ (10,20, ..., or 100) which corresponds to voltage (V1,V2, ..., or V10) responding to video signal of red, green, and blue (the waveform 1 in FIG. 11), and if the transmittivity of the second liquid crystal portion 52b is determined to be the transmittivity $\alpha 2$ (6,10, ..., or 100) which corresponds to voltage (V1,V2, ..., or V10) responding to video signals of red, green, and blue, (the waveform 2 in FIG. 11), the result transmittivity $\alpha(\%)$ obtained by both first and second liquid crystal portions 52a and 52b is the product of $\alpha 1$ times $\alpha 2$. The result transmittivity is indicated by the waveform 3 in FIG. 11.

As apparent from the table of FIG. 12 explaining the transmittivity according to the present embodiment of the invention, the result transmittivity $\alpha$ can be calculated by multiplying the transmittivity $\alpha 1$ of the first liquid crystal portion 52a by the transmittivity $\alpha 2$ of the second liquid crystal portion 52b. For the transmittivity $\alpha 1$ of 0, 10, 20, ..., and 100% and the transmittivity $\alpha 2$ of 0, 6, 10, ..., and 100%, therefore, the result transmittivity $\alpha$ ($\alpha 1 * \alpha 2$) of 0, 0.6, 1.2, ..., 100% can be obtained. Respective transmittivities $\alpha 1$ and $\alpha 2$ of liquid crystal portions 52a and 52b can be varied to have eleven values. Accordingly, 75 values of the transmittivity $\alpha$ ($\alpha 1 * \alpha 2$) can be totally obtained even when repeated values are omitted therefrom. The case when the transmittivity of the liquid crystal is 0% or 100% is an ideal case. Actually, it is impossible to obtain the transmittivity of 0% or 100%, due to the physical property of the liquid crystal itself. Particularly, maximum transmittivity $\alpha$max is naturally reduced in the case of double liquid crystal-transmitting in accordance with the present invention. This can be sufficiently compensated by using a light source generating more strong light which provides the same effect as in using a single liquid crystal portion. Red, green, and blue video signal voltages V1, V2, ..., and V10 and red, green, and blue video signal voltages V1, V2, ..., V10, which are applied to the first liquid crystal portion 52a and the second liquid crystal portion 52b, respectively, are supplied through drain lines D11, D12, and D13 and drain lines D21, D22, and D23, independently. However, the scanning line pulse applied through the gate line GL1 and the scanning line pulse applied through the gate line GL2 are synchronized with each other to actuate with the same timing as in using a single liquid crystal portion. If red video signal voltage has a certain value, this value of signal voltage is supplied to drain lines D11 and D21, independently. However, the gate pulse supplied to the gate line GL1 and the gate pulse supplied to the gate line GL2 actuate with same timing to present the transmittivity $\alpha 1$ of the liquid crystal light valves L11 and the transmittivity $\alpha 2$ of the liquid crystal light valves L21, respectively, thereby to obtain the transmittivity $\alpha$ corresponding to the product of the transmittivity $\alpha 1$ times the transmittivity $\alpha 2$. In the above description, the video signal voltage is expressed to have different values, that is, V1, V2, ..., V10, V1, V2, ..., and V10, in order to illustrate 11 variable values of the transmittivity. In modern liquid crystal display technology, it is possible to the transmittivity to have up to 16 variable values. In the present embodiment of the invention, therefore, the transmittivity is varied according to 11 variable values of voltage V1, V2, ..., V1, V2, ..., and V10 which are applied to drain lines D11 to D13 and drain lines D21 to D23.

Thus, variations in transmittivity can be obtained by using two liquid crystal portions 52a and 52b. In the case of providing different transmittivities, more variations in transmittivity can be obtained so that the number of repeated values of the result transmittivity can be substantially reduced and so that higher resolution display can be obtained.

Figure 13:
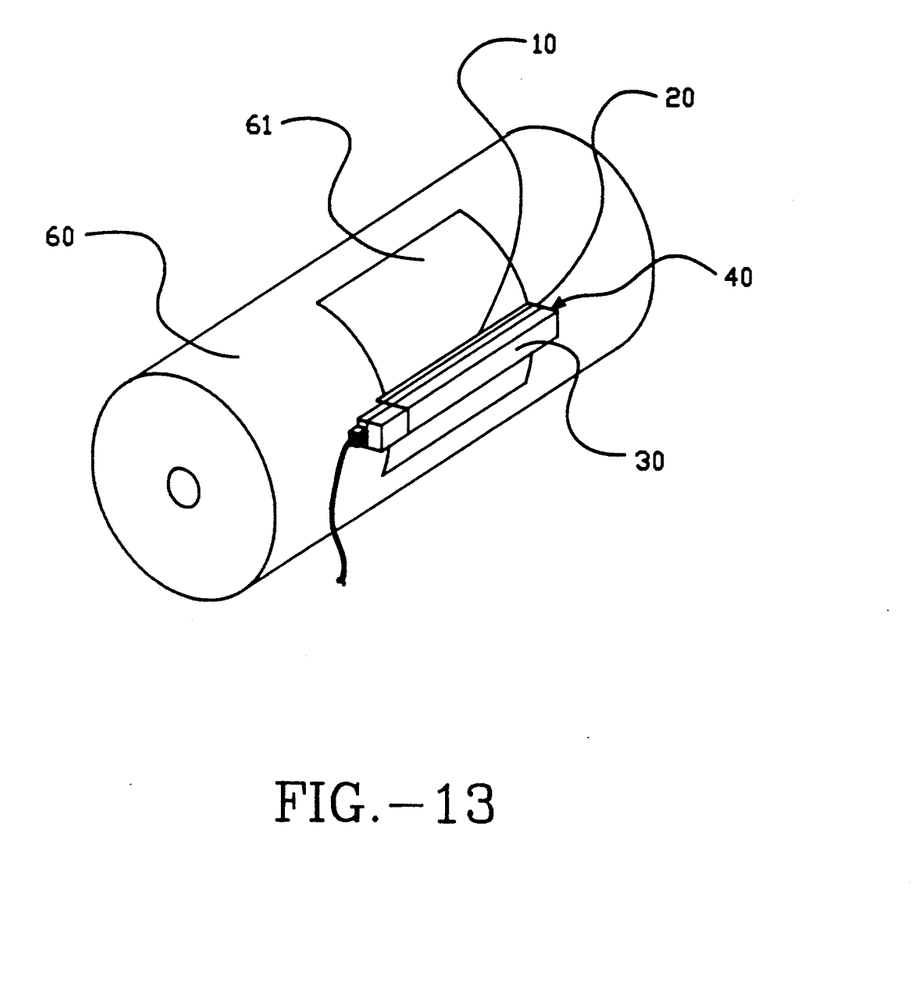
FIG. 13 is a perspective view showing use of the image-exposing apparatus for video printer in accordance with the present invention.

Referring to FIG. 13, there is shown an example of image-exposing apparatus for a color video printer using a fiber optics-display package 40 in accordance with the present invention. The color video printer comprises a drum 60 rotating by the drive force of a drive motor (not shown) and supporting a photosensitive medium 61. The fiber optics-display package 40 is disposed to be spaced in a certain distance away from one side of the drum 60 and adapted to record images corresponding to respective scanning lines on the photosensitive medium 61 in the same manner as mentioned above.

In case of applying the fiber optics-display package of the present invention to a color video printer equipped with a drum as above-mentioned, it is possible to use a compact size drum. Also, overall construction can be more compact by using a belt or like as guide means for the photosensitive medium, although not shown.

As apparent from the above description, the image-exposing apparatus for a video printer in accordance with the present invention comprises a fiber optics-face plate, a liquid crystal display, and light source means. Accordingly, the apparatus functioning to convert electric video signal into optical image and project light on a photosensitive medium can have more compact and simple construction, thereby enabling the manufacturing cost to be reduced. These effects can be improved when the fiber optics-liquid crystal display package is applied to a video printer equipped with a drum. Particularly, in case of using two liquid crystal portions with different transmittivity characteristics, various image display such as delicate neutral tint display can be obtained, thereby enabling image quality to be improved.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An image-exposing apparatus for a video printer comprising:
   a liquid crystal display including a liquid crystal portion and a color filter portion where, for each pixel,
   said liquid crystal portion has first, second and third liquid crystal pixel elements, said liquid crystal pixel elements having a common scanning line input for turning on the liquid crystal pixel elements, and each of said liquid crystal pixel elements having an independent video input for controlling the transmittivity of the liquid crystal pixel element, and
   said color filter portion has red, green and blue filter elements for filtering light from said first, second and third liquid crystal pixel elements, respectively,
   light source means disposed at the rear of said liquid crystal display and adapted to transmit light through the liquid crystal pixel elements and the filter elements of the liquid crystal display to form an image having, for each pixel, an intensity of red, green, and blue components proportional to the transmittivity of said first, second and third liquid crystal pixel elements, respectively;
   a fiber-optic face plate, disposed at the front of the liquid crystal display and provided with a screen having a photosensitive medium, for transmitting said image of the liquid crystal display onto said photosensitive medium; and
   a drum positioned opposite said photosensitive medium for receiving said image from the photosensitive medium.

2. An image-exposing apparatus for a video printer in accordance with claim 1, wherein said screen of the fiber-optics face plate comprises a bundle of fiber optical cables with a small diameter each comprising an inner core adapted to transmit light and a dark cladding coated around said inner core and adapted to prevent light from coming therethrough.

3. An image-exposing apparatus for a video printer in accordance with claim 1, wherein said liquid crystal portion of said display includes first and second liquid crystal portions parts, each part having different transmittivities depending on video signals, said first and second liquid crystal parts aligned for transmitting light from the light source mans to the filer portion of said display, each of said liquid crystal parts having, or each pixel,
   first, second and third liquid crystal pixel elements, said liquid crystal pixel elements having a common scanning line input for turning on the liquid crystal pixel elements, and each of said liquid crystal pixel elements having an independent video signal input for controlling the transmittivity of the liquid crystal pixel element.

4. An image-exposing apparatus for a video printer in accordance with claim 3, wherein said scanning line inputs for said liquid crystal pixel elements are each driven with the same common gate pulse.

5. An image-exposing apparatus for a video printer in accordance with claim 1 wherein said light source means includes a fluorescent lamp.

6. An image-exposing apparatus for a video printer comprising:
   a liquid crystal display including a liquid crystal portion and a color filter portion,
   said liquid crystal portion for forming horizontal rows of pixels where each pixel is defined by vertically-aligned first, second and third liquid crystal pixel elements controlled by first, second and third thin film transistors, respectively, each of said transistors for a liquid crystal pixel element having a gate for receiving a common scanning line input for turning on the transistors for the liquid crystal pixel elements at the same time and each of said transistors for a liquid crystal pixel element having a drain for receiving an independent video input for independently controlling the transmittivity of the liquid crystal pixel element in response to the video input,
   said color filter portion has red, green and blue filter elements for filtering light from said first, second and third liquid crystal pixel elements, respectively,
   light source means disposed at the rear of said liquid crystal display and adapted to transmit light through the first, second and third liquid crystal pixel elements of the liquid crystal display to form an image having, for each pixel, red, green and blue components with intensities proportional to the transmittivities of said first, second and third liquid crystal pixel elements, respectively; and
   a fiber-optic face plate, disposed at the front of the liquid crystal display and provided with a screen having a photosensitive medium, for transmitting said image of the liquid crystal display onto said photosensitive medium.

7. An image-exposing apparatus for a video printer comprising:
   a liquid crystal display including a liquid crystal portion and a color filter portion,
   said liquid crystal portion for forming horizontal rows of pixels, said liquid crystal portion having two parts, said first and second liquid crystal parts aligned for transmitting light to the filter portion of said display, where each part has independently controlled transmittivity and where for each part, each pixel is defined by vertically-aligned first, second and third liquid crystal pixel elements controlled by first, second, and third thin film transistors, respectively, each of said transistors for a liquid crystal pixel element having a gate for receiving a common scanning line input for turning on the transistors for the liquid crystal pixel element at the same time and each of said transistors for a liquid crystal pixel element having a drain for receiving an independent video input for independently controlling the transmittivity of the liquid crystal pixel element in response to the video input,
   said color filter portion has red, green and blue filter elements for filtering light from said first, second and third liquid crystal pixel elements, respectively,
   light source means disposed at the rear of said liquid crystal display and adapted to transmit light through the liquid crystal pixel elements of the liquid crystal display to form an image having, for each pixel, red, green and blue components with intensities proportional to the transmittivities of said first, second and third liquid crystal pixel elements, respectively, for each of said parts; and a fiber-optic face plate, disposed at the front of the liquid crystal display and provided with a screen having a photosensitive medium, for transmitting said image of the liquid crystal display onto said photosensitive medium.

* * * * *